L. BONSIEUR
Sept. 16, 1930. COMMUTATOR AND METHOD OF MAKING SAME Re. 17,801
Original Filed Dec. 1, 1924
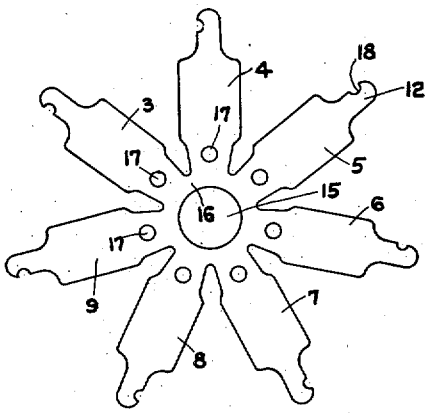
Fig. 5
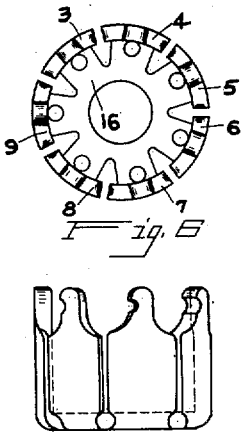
Fig. 6
Fig. 7
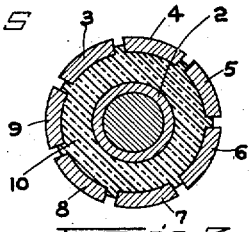
Fig. 3
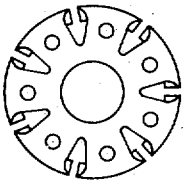
Fig. 8
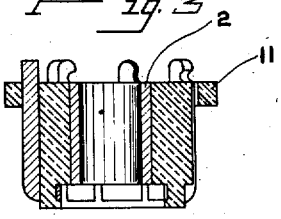
Fig. 4
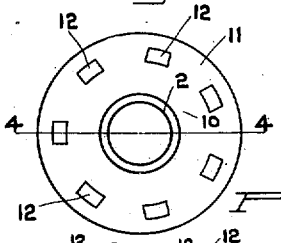
Fig. 2
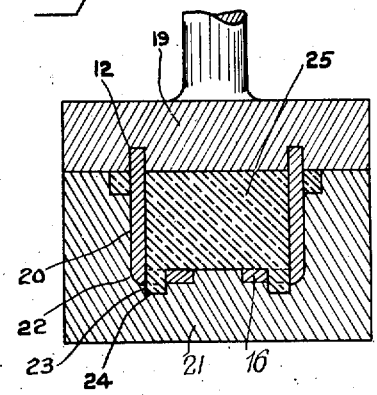
Fig. 10
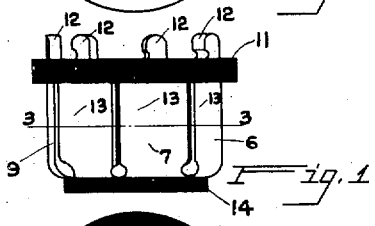
Fig. 1
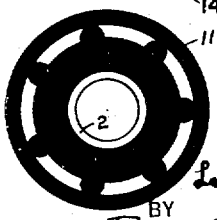
Fig. 9
INVENTOR
L. Bonsieur
BY
Richey Slough + Watts,
His ATTORNEYS.

Reissued Sept. 16, 1930 Re. 17,801

UNITED STATES PATENT OFFICE

LE BONSIEUR, OF ELYRIA, OHIO, ASSIGNOR TO THE GENERAL INDUSTRIES COMPANY, OF ELYRIA, OHIO, A CORPORATION OF OHIO

COMMUTATOR AND METHOD OF MAKING SAME

Original No. 1,631,461, dated June 7, 1927, Serial No. 753,411, filed December 1, 1924. Application for reissue filed January 5, 1929. Serial No. 330,605.

My invention relates to commutators and the method of making the same, and relates more particularly to the making of relatively small commutators such as are adapted for use upon small electrical motors which may be employed in electrical signal horns, for driving phonograph mechanisms and for driving toy machinery and the like, although my invention is not limited to such uses, but may be employed in connection with the making of commutators for larger motors for driving fans and for other purposes.

An object of the present invention is to simplify the making of commutators for electric motors and the like so that they can be more inexpensively manufactured in quantities.

Another object of my present invention is to accomplish the making of small sized commutators without the necessity of utilizing any considerable amount of hand operations incidental to the manufacture thereof.

Another object of my invention is to accomplish the making of small sized commutators of the aforesaid types which will be uniform when produced in large quantities and which will be rugged when completed and which will retain their ability to perform the commutating function in electric motors even when used for long periods under severe conditions of use.

Another object of the present invention is to economically produce in large quantities small-sized commutators in which the insulating medium may be applied by a plastic molding process and which when congealed will efficiently hold togther the commutator segments and resist deforming of the commutator by the single or conjoint effects of heat and mechanical shocks.

Other objects of my invention and the invention itself will become apparent as the description of certain embodiments thereof herein illustrated and described progresses.

Referring to the drawings forming a part of this specification—

Fig. 1 shows a side elevational view of a commutator constructed according to the principles of my invention by employment of the method described herein;

Fig. 2 shows the commutator of Fig. 1 viewed from the rear, the view being a plan view;

Fig. 3 is a transverse section taken on the line 3—3 of Fig. 1;

Fig. 4 is a longitudinal medial sectional view taken on the line 4—4 of Fig. 2;

Fig. 5 shows a plan view of a sheet metal stamping comprising the commutator segments extending radially from a common center and being joined together adjacent such center;

Fig. 6 shows an end view of the joined commutator segments of Fig. 5 subsequent to a bending operation in which the radially extending segments of Fig. 5 are so bent as to define an approximately cylindrical hollow cup;

Fig. 7 is a side elevation of the formed stamping of Fig. 6;

Fig. 8 is an end plan view of the stamping of Fig. 7 viewing the same from below as shown;

Fig. 9 is an end view of the commutator of Fig. 4 as seen from below;

Fig. 10 is a longitudinal medial sectional view of a tool and die for compressing the congealing phenolic condensation material contained within the cup-shaped stamping of Fig. 8.

In Fig. 1 I show a commutator completed and ready to be slipped onto a motor shaft by a tight driving fit thereon preferably, the commutator comprising a centrally disposed tube 2 preferably of soft steel and a plurality of commutator segments 3, 4, 5, 6, 7, 8 and 9 surrounding the said tube 2 and insulated therefrom by insulating material 10 which may be of any of a number of different compositions, but which I will describe herein as being preferably of that phenolic condensation material commonly known a bakelite. This bakelite insulating material extends entirely within the space between the tube 2 and the segments, and preferably also extends between the segments near one end thereof and around the segments as shown at 11.

The portion 11 of the insulating material joined to the inner portion 10 thereof forms a band or ring of insulating material outside the commutator segments and adjacent the terminals 12 of the segments, and prevents any portion of the solder or soldering fluxes employed in soldering electrical conductors to the terminals 12 from flowing out over the content portions 13 of the segments.

The insulating material may also be projected beyond the segments at the other end to form an insulating band portion 14, the bands 11 and 14 joining integrally with the insulating material 10, making an integral insulating support for the commutator segments 3 to 9 inclusive and being preferably formed of a phenolic condensation material such as bakelite, will withstand considerable heat and severe mechanical blows, shocks and vibrations.

The steel tube 2 is preferably contained within the body of insulating material 10 particularly where the commutator is to be made in the larger sizes as it may be driven onto a motor shaft very tightly and without the danger of thereby causing the body of the commutator to be expanded unduly and beyond its elastic limit to crack the commutator.

The commutator, however, may be used with or without the tube 2, its use being optional and desirable principally in the larger sizes of commutators.

The commutator of Figs. 1 to 4 inclusive is preferably formed from a single sheet metal stamping such as a stamping of brass or copper, being cut in a form such as that shown in Fig. 5 wherein the wings for forming the commutator segments 3 to 9 inclusive are shown as extending outwardly, radially, from a common center whereat the stamping is preferably perforated as shown at 15 and the segments being joined together by a connecting ring of the sheet metal shown at 16. Perforations 17 may be provided, their use being optional, but where provided as shown, the blank, especially when of thick material, may be more easily bent adjacent such perforations, and the material may be cut away thereat somewhat more easily.

The ends of the segment portions are preferably formed in the accepted shape for electrical terminals as shown at 12 comprising a hook portion 18 adapted to receive an electrical circuit conducting wire which may be soldered to the terminal 12 after the commutator has been completed and placed on a motor shaft. The stamping as shown in Fig. 5 is then placed in a punch-press and in the manner usual for such pressing operations, the radially extending arms of the stamping comprising the segments in the ultimate product are bent into substantially cylindrical cup-defining form as shown in the figure, and the ring shaped joining portion 16 forming the bottom wall of the cup-defining article so formed.

The resultant integrally formed piece is illustrated in Figs. 6 to 8 inclusive which show respectively the article in end, plan, side elevational and opposite end plan views, the adjacent edges of the so-called segment arms 3 to 9 inclusive may be machined at this stage of the operation as by running a cutting saw between the segment arms. This machining operation, however, may be omitted as the adjacent edges are usually sufficiently regular, and spaced that no machining is necessary.

The cup-shaped article is then placed in a suitably formed die recess and filled with bakelite insulating material in preferably powdered form and the bakelite therein then heated and subjected to pressure by an advancing tool 19 compressing the heated material within the cavity 20 of the die 21, reference being had to Fig. 10 showing the die having the cavity 20 with a shelf portion 22 recessed from the surface 23 of the die and having a stepped portion 24 at the bottom of the cavity, the recess 24 and the shelf 22 as well as the interior 25 of the cavity being filled with heated bakelite which while being congealed from plastic condition is subject to the pressure of a pressure tool 19 pressed downwardly over the ends 12 of the commutator segments and into intimate pressure creating contact with the body of insulating material congealing within the cavity.

The tool 19 receives the ends 12 of the so-called segments in a recessed bottom face of the tool, the depth of recess being sufficient to clear the ends of the terminals 12.

The commutator may be provided with an axial bore in any suitable way, such as by projecting a suitable tool axially therethrough, as by directing the cutting end of a bit or cutting tool axially through the opening 15 of the commutator shell and then through the insulating material to produce the axial opening through which the motor shaft, upon which the commutator is to be mounted, may be passed. A similar tool having a larger diameter may now be passed into the opening thus formed so that the cutting edges of the bit will remove the joining portion or ring 16 whereby the segments 3 to 9 inclusive will be separated and electrically insulated one from the other as shown in Figs. 1 and 4.

The finished commutator is shown in Figures 1 and 4, and as therein shown comprises a plurality of commutator segments 3 to 9 inclusive, having contact surfaces 52, each forming a portion of the complete cylindrical outer surface of the commutator, the insulating material 25 connecting all of the segments and holding them against dislodgement, filling the inner segmental spaces and preventing the spacing between the segments becoming modified.

The axial bore of the commutator is made of such a size that the commutator will fit tightly on the end of a motor shaft making frictional contact therewith and this frictional contact may be increased by knurling or otherwise roughening the motor shaft at the point where the commutator is forced onto it. I prefer, however, to solder the electrical circuit conductors leading the motor armature windings to the terminals 12 of the commutator segments.

Having thus described my invention in different embodiments, I am aware that the same may be practiced according to the principles of my invention, but according to methods departing colorably from the complete method herein described for accomplishing the result of my invention and that the product of the method herein described may be produced by other methods but such departures will be comprehended in the spirit of my invention and in the accompanying claims.

I claim:

1. The method of making a commutator comprising a plurality of segments, consisting of cutting from sheet metal a piece having radially extending arms joined at their inner ends and at their outer ends having relatively narrow portions, then bending the arms so as to approximately define a cylindrical cup, then in placing a plastic congealable insulating compound within the substantially cup-shaped article thereby produced and causing a portion of the compound to flow between the arms at said narrow portions to form a band surrounding the arms but united thereto, and to the rest of the compound within the arms by elements of large cross-section between said narrow portions causing the compound to congeal, and subsequently removing the portion of the sheet metal joining the inner ends of the arms.

2. A commutator having a plurality of segments, each of said segments comprising an intermediate portion having an outer contact surface, the contact surfaces of the segments being so formed as to approximately define a cylinder, one end of each segment being turned inwardly and the other end having a relatively narrow portion, and a body portion of cementitious congealable insulating material uniting and spacing the segments, said body portion having a bore axial to the segment contact surfaces, and an insulating band surrounding the segments at a point adjoining their contact surfaces, said band being united firmly to the said insulating material body portion by connecting insulating material portions extending between the narrow portions of the segments.

3. A commutator having a plurality of segments, each of said segments comprising an intermediate portion having an outer contact surface, the contact surfaces of the segments being so formed as to approximately define a cylinder, one end of each segment being turned inwardly and the other end having a relatively narrow portion, and a body portion of cementitious congealable insulating material uniting and spacing the segments, said body portion having a bore axial to the segment contact surfaces, and an insulating band surrounding the segments at a point adjoining their contact surfaces and joined to the body portion by portions of the insulating material between the narrow portions of the segments.

4. The method of making a commutator comprising a plurality of segments, which includes cutting from sheet metal a piece having outwardly extending arms joined at their inner ends by relatively narrow portions, then bending the arms at said narrow portion so as to approximately define a cup with the arms closely adjacent, passing a cutting tool between adjacent arms to space and finish them, then placing a plastic congealable insulating compound within the substantially cup-shaped article thereby produced, causing the compound to congeal, and removing the portion of the sheet metal joining the inner ends of the arms.

5. The method of making a commutator comprising a plurality of segments, which includes cutting from sheet metal a piece having outwardly extending arms joined at their inner ends by relatively narrow portions, then bending the arms at said narrow portions so as to approximately define a cup with the arms closely adjacent, passing a cutting tool between the adjacent arms to space and finish them, then placing a phenolic condensation material within the substantially cup-shaped article thereby produced, subjecting the phenolic condensation material to the combined effects of heat and pressure to flow the material to fill the space provided within the arms causing the material to harden, and removing the portion of the sheet metal joining the inner ends of the arms.

6. The method of making a commutator comprising a plurality of segments which includes cutting from sheet metal a piece having radially extending arms joined at their inner ends and at their outer ends having relatively narrow portions, then bending the arms so as to substantially define a cylindrical cup, then placing a phenolic condensation material within the substantially cup-shaped article thereby produced and causing a portion of the material to flow between the arms at said narrow portions to form a band surrounding the arms but united to the rest of the material within the arms by elements of large cross-section between said narrow portions, subjecting the phenolic condensation material to the combined effects of heat and pressure to reduce the material to a flowing condition, causing the heated material to harden, and removing the portion of the sheet metal joining the inner ends of the arms.

7. The method of making a commutator comprising a plurality of segments which includes cutting from sheet metal a piece having outwardly extending arms joined at their inner end by relatively narrow portions, bending the arms at said narrow portions to approximately define a cup with a plurality of apertures in the cup bottom annularly disposed and formed from the spaces between said relatively narrow portions, placing a plastic congealable insulating compound within the plastic cup-shaped article thereby produced and causing a portion of the compound to flow through said apertures to form a band on the outside of the cup bottom united to the compound within the cup by elements of relatively large cross-section extending through said apertures, causing the compound to congeal, and removing the portion of the sheet metal joining the inner ends of the arms.

8. The method of making a commutator comprising a plurality of segments which includes cutting from sheet metal a piece having outwardly extending arms joined at their inner ends by relatively narrow portions, bending the arms at said narrow portions to approximately define a cup with a plurality of annularly disposed apertures in the cup bottom formed by the spaces between said narrow portions, placing a phenolic condensation material within the substantially cup-shaped article thereby produced, causing a portion of the material to flow through said apertures to form a band on the bottom of the cup united to the material within the cup by connecting portions of relatively large cross-section in the apertures, subjecting the phenolic condensation material to the combined effects of heat and pressure to flow the material causing the material to harden and removing a portion of the sheet metal joining the inner end of the arms.

9. A commutator having a plurality of segments, each of said segments comprising an intermediate portion having an outer contact surface, the contact surfaces of the segments being so formed as to approximately define a cup, one end of each segment being turned inwardly, and at the other end having a relatively narrow portion, and a body portion of cementitious congealable insulating material uniting and spacing the segments, said body portion having a bore axial to the segment contact surfaces, and an insulating band surrounding the segments at a point adjoining their contact surfaces, said band being united firmly to the said insulating material body portion by connecting insulating material portions extending between the relatively narrow portions of the segments.

10. A commutator having a plurality of segments, each of said segments comprising an intermediate portion having an outer contact surface and comprising a relatively narrow end portion, the contact surfaces of the segments being so formed as to approximately define a cup, one end of each segment being turned inwardly, and a body portion of cementitious congealable insulating material uniting and spacing the segments, said body portion having a bore axial to the segment contact surfaces, and an insulating band surrounding the segments adjacent to but spaced from the segment ends and joined to the body portion by connecting portions between said narrow portions of the segments.

11. A commutator having a plurality of segments, each of said segments comprising an intermediate portion having an outer contact surface, the contact surfaces of the segments being so formed as to approximately define a cup, the inner end of each segment being turned inwardly, a plurality of annularly disposed faces in the cup bottom formed by enlargements of the spaces between adjacent segments, a body portion of cementitious congealable insulating material within the cup, a band of the said material on the outside of the cup bottom joined to the material within the cup by portions of the material of relatively large cross-section in said apertures.

12. In a commutator, a plurality of segments having outer contact surfaces disposed in substantially tubular alignment, the segments having relatively narrow portions at their inner ends bent inwardly to define the cup bottom and to provide a plurality of annularly disposed spaces therebetween, and the segments terminating outwardly in relatively narrow extensions, a band of insulating material surrounding the segments exteriorly thereof, a body of insulating material inside of the cup joined to the said band by integral portions of material extending through the spaces between the narrow outer end extension of the segments, and a band of insulating material on the outside surface of the cup bottom joined to the body of insulating material by integral extensions extending through the spaces at the inner ends of the segment.

13. A metal frame for commutator structures, comprising a cup-shaped article having a central portion forming the end wall thereof and arms integrally formed therewith extending therefrom, the arms comprising tubularly disposed parts spaced apart to form commutator segments, the interconnecting portions of said arms being relatively narrow circumferentially and the arms being bent at said narrow portions whereby the segment portions may be caused to lie closely adjacent.

14. A metal frame for commutator structures comprising a cup-shaped article having a central portion forming the end wall thereof and arms integrally formed therewith extending therefrom in generally axially parallel tubularly disposed relation spaced apart to form commutator segment portions, the segment portions being joined to the said central portion by interconnecting portions, the interconnecting portions being bent intermediately, and the interconnecting portions being relatively narrower than the segment portions to provide apertures in the end wall of the cup.

15. A metal frame for commutator structures, comprising a cup-shaped article having a central portion forming the end wall thereof and arms integrally formed therewith extending therefrom and bent relatively thereto in substantially parallel tubularly disposed spaced parts to form commutator segment portions, the segment portions being joined to the central portion by connecting portions and the connection portions being intermediately bent and the connecting portions being substantially narrower than the segment portions to provide apertures in the cup bottom and the outer end portions of the segments being relatively narrower than the segment portions.

16. As an article of manufacture, a commutator blank comprising a central portion and arms integrally formed therewith extending radially thereform, the central portion being generally annular and the arm portions comprising relatively wide segment portions and relatively narrow inner portions connecting the segment portions with the annular portion and the segment portions terminating outwardly in relatively narrow extensions.

17. As an article of manufacture, a commutator blank comprising a central portion and arms integrally formed therewith extending radially therefrom, the central portion being generally annular and the arm portions comprising relatively wide segment portions, and relatively narrow inner portions connecting the segment portions with the annular portion.

18. As an article of manufacture, a commutator blank comprising a central portion and arms integrally formed therewith extending radially therefrom, the central portion being generally annular and the arm portions comprising relatively wide segment portions and the segment portions terminating outwardly in relatively narrow extensions.

In witness whereof I hereunto affix my signature this 7th day of December, 1928.

LE BONSIEUR.